March 13, 1928.  1,662,271
J. A. JOHNSON
TRANSFERRING MACHINE FOR BOTTLE CLOSURES
Filed Feb. 25, 1925   3 Sheets-Sheet 1
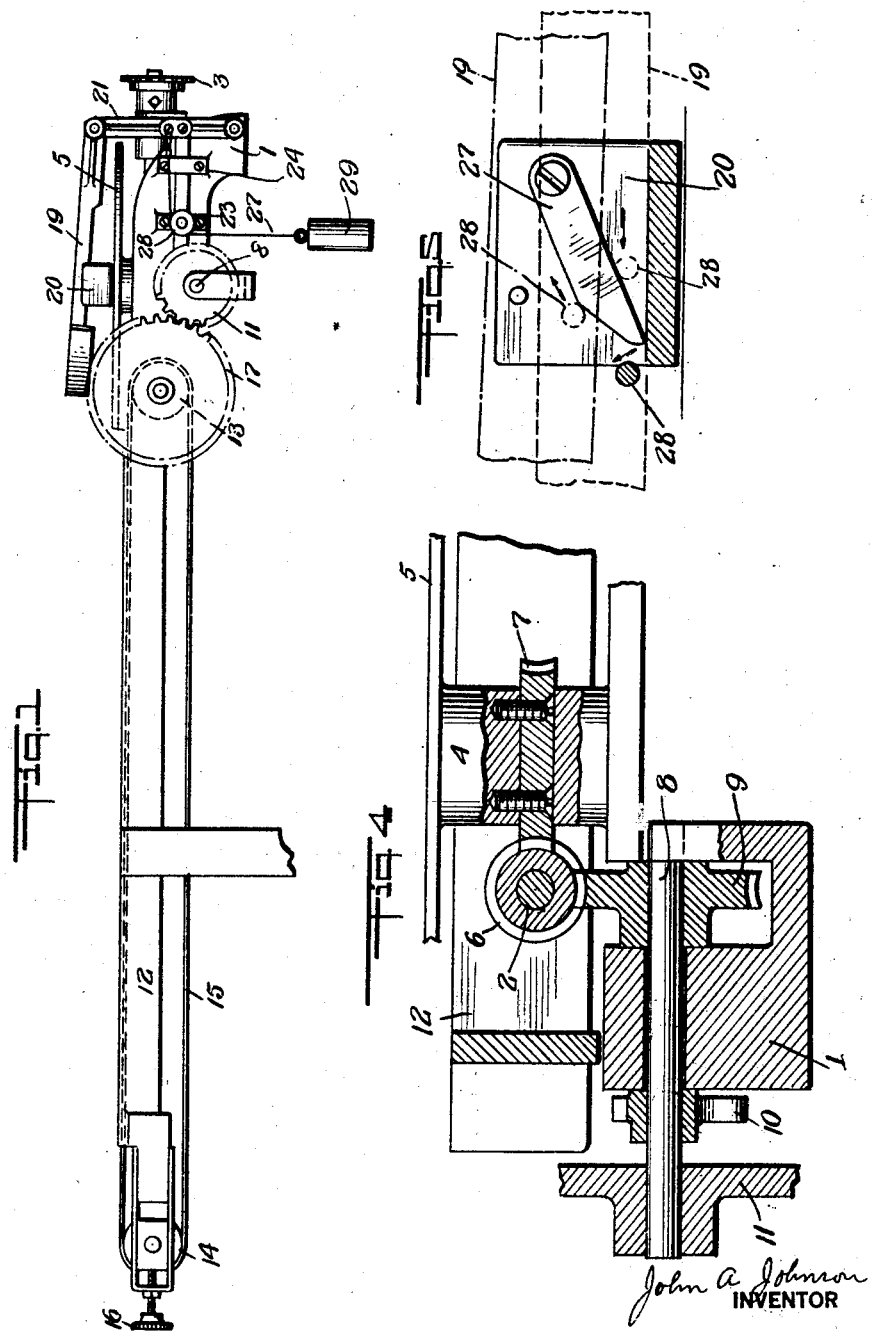

March 13, 1928.  
J. A. JOHNSON  
1,662,271  
TRANSFERRING MACHINE FOR BOTTLE CLOSURES  
Filed Feb. 25, 1925  
3 Sheets-Sheet 2
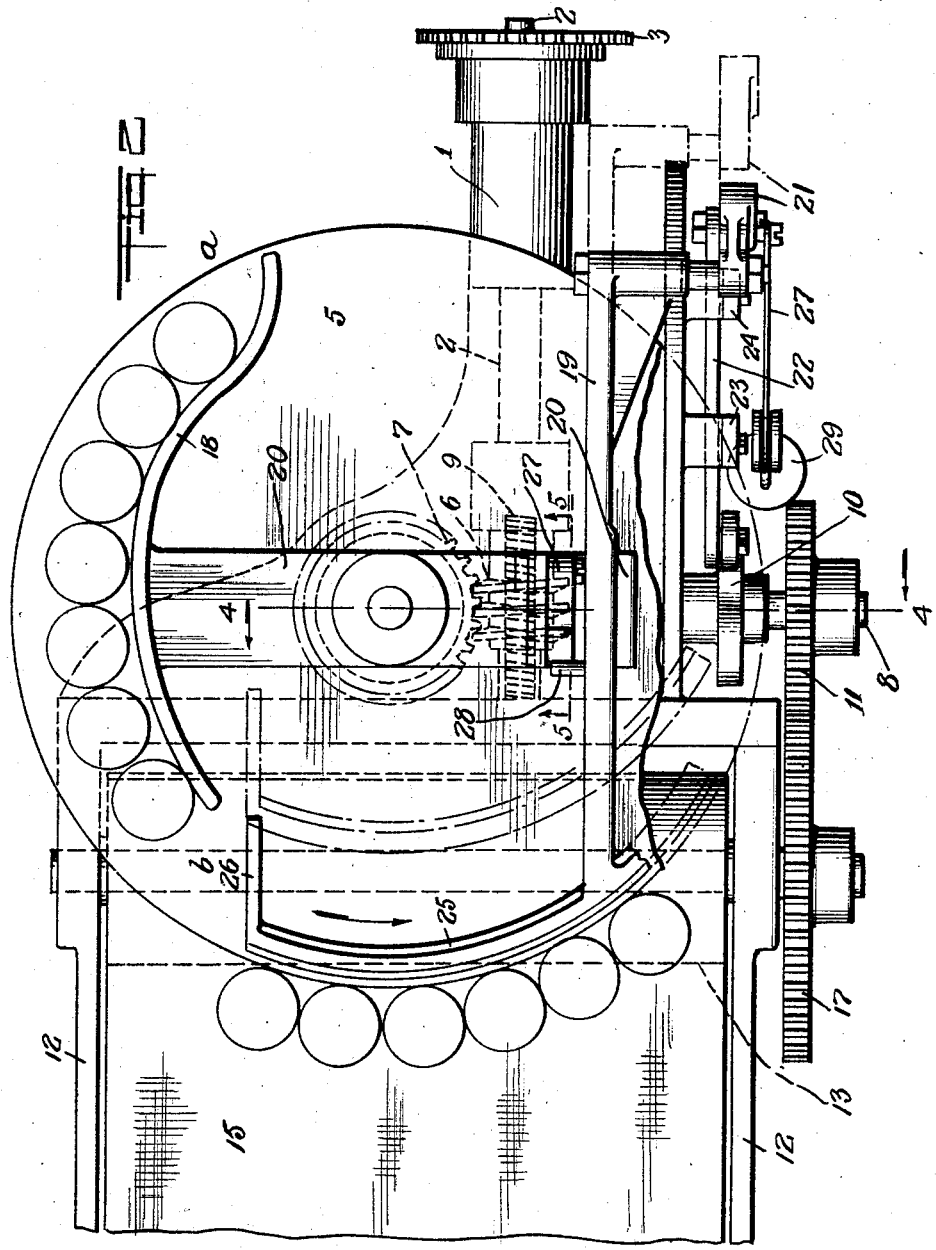
John A. Johnson
INVENTOR
BY Robert B. Killgore
ATTORNEY

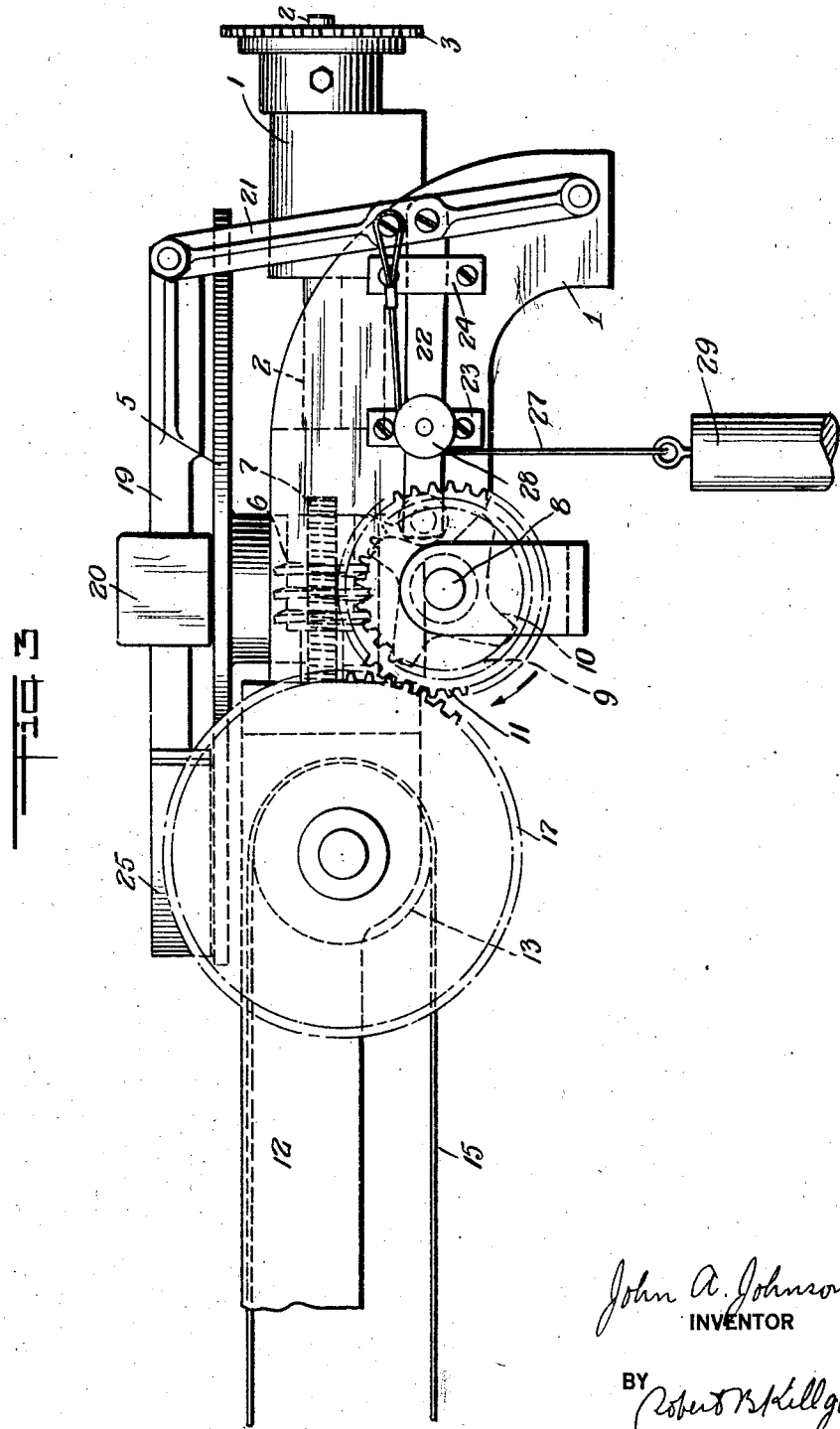

Patented Mar. 13, 1928.

1,662,271

UNITED STATES PATENT OFFICE.

JOHN A. JOHNSON, OF NEW YORK, N. Y.

TRANSFERRING MACHINE FOR BOTTLE CLOSURES.

Application filed February 25, 1925. Serial No. 11,498.

My invention relates to machines for transferring crown caps or other closures from the assembling machines and placing them in orderly rows on a travelling belt on which they are conveyed past the inspectors for the removal of those which may be defective and it is my object to construct a simple machine which will receive the caps as fast as they are assembled and transfer them to the inspection belt at regular intervals. Another object is to so construct the machine that it may be readily attached to existing assembling machines and be driven therefrom and in synchronism therewith.

In the drawing Fig. 1 is a side view of my machine; Fig. 2 a top view thereof, partly in section; Fig. 3 a detail view of the transferring mechanism; Fig. 4 a detail view of the mechanism for driving the revolving table, pusher and belt; and Fig. 5 a detail view of the "under and over" device for raising and lowering the pusher bar.

The machine comprises a frame 1 carrying a horizontal shaft 2 with a sprocket wheel 3 secured thereto so that the machine may be driven by a chain from the assembling machine, the latter not being shown herein.

The frame also carries a vertical shaft 4 to the upper end of which a revolving table 5 is secured. This table is revolved by a worm 6 on the shaft 2 which meshes with a worm gear 7 on the shaft 4. A third shaft 8, at right angles to the shaft 2, carries a worm gear which also meshes with the worm 6 and is revolved thereby. This shaft 8 also carries a cam 10 and a gear 11.

An extension 12 of the frame carries two rollers 13 and 14 over which a belt 15 is stretched, a tension device 16 being secured to one roller to tighten the belt when necessary. A gear 17 on the roller 13 meshes with the gear 11 so that when the shaft 2 is revolved the table 5 and the roller 13 will both revolve, the latter causing the belt to travel.

A stationary guide rail 18 is mounted over the table on one side and the table receives the closures from the assembling machine at the point $a$ at the end of the rail. As the table revolves the caps are carried to the point $b$.

To transfer the caps from the table to the belt a pusher bar 19 is slidably mounted in a stationary bracket 20 over the table. The rear end of this pusher bar has a link 21 which link is pivoted to the frame at its lower end. A second link 22 extends through guides 23 and 24 on the frame with its free end, provided with a small roller, in contact with the cam 10 and its other end connected to the link 21 midway between its ends. This cam, as shown in Fig. 3 has four high points, with an easy lift and a quick drop as shown, and as it revolves will reciprocate the pusher bar four times during each revolution of the table.

The pusher head proper has the curved portion 25 facing the belt and the end portion 26, adjacent the point $b$, extends across the path of the caps to act as a cut-off when the pusher bar is down.

To cause the pusher bar to rise and fall as it reciprocates a swinging latch 27 is mounted on the bracket 20 and the arm of the pusher bar 19 has a pin 28 thereon. As shown in Fig. 5 as the pusher arm goes forward (shown in dot and dash lines) the pin 28 passes under the latch 27 slightly raising it, on the return stroke the pin 28 rides over the bevelled nose of the latch and up the incline, lifting the pusher bar head 25 clear of the table until it clears the latch at the rear when it drops off allowing the pusher bar head to drop down into contact with the table on the forward stroke.

The caps carried on the table will come to a stop if the pusher bar head is down by reason of the cut-off 26 being in their path and the table will slide under them. When the pusher head is raised on the rearward stroke the cut-off 26 rises with it and the table will carry the caps to a position in front of the belt. The pusher head then drops down onto the table behind the caps in front of the belt and on the forward stroke the caps are transferred to the moving belt on which they travel past the inspectors. As the caps are assembled with the inner faces exposed, or up, the defective ones can be seen and removed as they pass the inspectors.

To hold the end of the link 22 in yieldable contact with the cam 10 a cord 27 runs from the link 21, over a pulley 28 on the frame and has a weight 29 on its lower end. If any jamming occurs in the operation of the pusher bar the weight will be lifted without injury to the machine.

I claim:—

A transferring machine comprising a frame, a table thereon, means for revolving said table, a stationary bracket over said table, a pusher bar slidably mounted in said bracket, a pusher head thereon, a latch pivoted on said bracket, a pin on the pusher bar adapted to engage the latch, means for reciprocating the pusher bar whereby the pin will pass under the latch on the forward stroke and over the latch on the rearward stroke thereby raising the pusher head on said stroke.

In testimony whereof I have affixed my signature.

JOHN A. JOHNSON.